US010012291B2

(12) United States Patent
Speer

(10) Patent No.: US 10,012,291 B2
(45) Date of Patent: Jul. 3, 2018

(54) LOW MODULUS BELT UTILIZING TENSILE MEMBER AND BELT CARCASS

(71) Applicant: ContiTech Antriebssysteme GmbH, Hannover (DE)

(72) Inventor: William Speer, Springfield, MO (US)

(73) Assignee: ContiTech Antriebssysteme GmbH, Hannover (DE)

( * ) Notice: Subject to any disclaimer, the term of this patent is extended or adjusted under 35 U.S.C. 154(b) by 0 days.

(21) Appl. No.: 15/215,643

(22) Filed: Jul. 21, 2016

(65) Prior Publication Data
US 2018/0023663 A1    Jan. 25, 2018

(51) Int. Cl.
*F16G 1/28* (2006.01)
*F16G 5/20* (2006.01)
*F16G 1/08* (2006.01)

(52) U.S. Cl.
CPC ........ *F16G 1/08* (2013.01); *F16G 1/28* (2013.01)

(58) Field of Classification Search
CPC ..... F16G 5/06; F16G 5/20; F16G 1/28; F16G 5/08; B29D 29/10
USPC ......................................... 474/205, 260–262
See application file for complete search history.

(56) References Cited

U.S. PATENT DOCUMENTS

| 455,524 A | * | 7/1891 | Wood | G01R 21/00 200/403 |
| 549,821 A | * | 11/1895 | Quinn | D21F 1/10 245/8 |
| 605,665 A | * | 6/1898 | Duncan | G01R 11/36 324/137 |
| 1,890,080 A | * | 12/1932 | Freedlander | F16G 5/20 474/251 |
| 1,920,482 A | * | 8/1933 | Toulmin, Jr. | F16G 5/20 474/261 |
| 2,588,647 A | * | 3/1952 | Mitchell | B29D 29/10 156/139 |
| 2,661,045 A | * | 12/1953 | Huber | B29D 29/10 156/171 |
| 3,260,126 A | * | 7/1966 | Waugh | F16G 5/06 474/261 |
| 3,523,462 A | * | 8/1970 | Beindorf | F16G 5/10 29/460 |

(Continued)

FOREIGN PATENT DOCUMENTS

WO    2009066492 A1    5/2009

*Primary Examiner* — Henry Y Liu
(74) *Attorney, Agent, or Firm* — David L. Cate

(57) ABSTRACT

An endless belt is provided includes a compression section, a tension section, and a cover layer, together defining a longitudinal direction of the endless belt. The tension section has a plurality of tensile members extending at an angle of 0° to 45° relative to the longitudinal direction of the endless belt, and the tensile members are orientated a zig-zag pattern. In some cases, the plurality of tensile members extend along the longitudinal direction of the belt at an angle of 0°. Each of the plurality of tensile members may be continuous or discontinuous. The tensile members may be laid in a plane substantially parallel with the longitudinal direction of the belt. The tension section may include two sets of a plurality of tensile members, where the first set tensile members are orientated in a first zig-zag pattern and the second set of tensile members are orientated in a second zig-zag pattern.

14 Claims, 2 Drawing Sheets

(56) References Cited

U.S. PATENT DOCUMENTS

| | | | | |
|---|---|---|---|---|
| 3,530,033 A * | 9/1970 | Hildebrandt | B29D 29/00 | 156/177 |
| 3,584,516 A * | 6/1971 | Burpulis | F16G 5/08 | 474/261 |
| 3,863,515 A * | 2/1975 | Meadows | F16G 5/08 | 474/262 |
| 3,968,703 A * | 7/1976 | Bellmann | B29D 29/10 | 474/237 |
| 4,022,071 A * | 5/1977 | Abatemarco | F16G 5/10 | 474/262 |
| 4,099,422 A * | 7/1978 | Cicognani | B32B 25/10 | 474/205 |
| 4,137,787 A * | 2/1979 | Waugh | B29D 29/10 | 156/139 |
| 4,169,393 A * | 10/1979 | Wetzel | F16G 5/20 | 139/DIG. 1 |
| 4,177,688 A * | 12/1979 | Howerton | B29D 29/103 | 156/137 |
| 4,246,055 A * | 1/1981 | Henderson | F16G 5/20 | 156/138 |
| 4,255,147 A * | 3/1981 | Miranti, Jr. | F16G 5/08 | 156/141 |
| 4,299,587 A * | 11/1981 | Imamura | F16G 5/08 | 474/262 |
| 4,305,713 A * | 12/1981 | Imamura | F16G 5/166 | 474/238 |
| 4,392,842 A * | 7/1983 | Skura | F16G 1/28 | 474/205 |
| 4,432,744 A * | 2/1984 | Imamura | D03D 1/0094 | 474/238 |
| 4,445,879 A * | 5/1984 | Cicognani | F16G 1/28 | 474/205 |
| 4,449,959 A * | 5/1984 | Matsumura | F16G 5/20 | 474/238 |
| 4,555,241 A * | 11/1985 | Takano | F16G 5/06 | 474/205 |
| 4,657,526 A * | 4/1987 | Tangorra | F16G 5/20 | 474/261 |
| 4,734,086 A * | 3/1988 | Fisher | F16G 5/166 | 156/139 |
| 4,877,126 A * | 10/1989 | van Calker | B65G 15/34 | 198/847 |
| 5,362,281 A * | 11/1994 | Dutton | F16G 1/28 | 474/205 |
| 5,536,554 A * | 7/1996 | Wall | B32B 5/12 | 428/113 |
| 5,858,147 A * | 1/1999 | Goettsch | B29C 70/22 | 139/DIG. 1 |
| 6,132,328 A * | 10/2000 | Kinoshita | D02G 3/28 | 474/260 |
| 6,135,907 A * | 10/2000 | Hong | F16G 1/00 | 474/148 |
| 7,217,210 B2 * | 5/2007 | Wood | F16G 1/08 | 474/260 |
| 2002/0098935 A1 * | 7/2002 | Danhauer | F16G 5/20 | 474/261 |
| 2003/0203781 A1 * | 10/2003 | Welk | F16G 1/08 | 474/237 |
| 2005/0215372 A1 * | 9/2005 | Wood | F16G 1/08 | 474/205 |
| 2008/0153647 A1 * | 6/2008 | Muma | A01F 15/18 | 474/262 |

* cited by examiner

LOW MODULUS BELT UTILIZING TENSILE MEMBER AND BELT CARCASS

FIELD

The field to which the disclosure generally relates to is power transmission belts, and more specifically, power transmission belts where the belt is reinforced with tensile members applied in a "zig-zag" orientation.

BACKGROUND

This section provides background information to facilitate a better understanding of the various aspects of the disclosure. It should be understood that the statements in this section of this document are to be read in this light, and not as admissions of prior art.

In conventional power transmission belts, the belt has an inner compression section, an outer tension section, and an intermediate neutral plane. Typically, helically wound reinforcing cords are located within the neutral plane and so the neutral plane is also referred to as the load carrying zone. Such belts also having a variety of groove and rib configurations, using longitudinal or transverse grooves or a combination of both. The grooves are located in the inner compression section of the belt. The grooves assist in engaging a pulley in the power transmission system. For some belts, grooves and rib configurations may also be provided in the outer tension section.

The reinforcing cords in the load carrying zone provide a majority of the tensile strength to the belt. Thus, the materials forming the belt are important. It is known to use high modulus material for the reinforcing cords, including the use of poly(p-phenylene-2,6-benzobisoxazole). However, due to the distinct physical properties of the PBO yarns, simple substitution of PBO yarns for known polyester or aramid cords in power transmission belts may not yield a belt having acceptable performance properties.

Typical low modulus belts utilize a low modulus tensile member to provide the elongation necessary to provide installation and maintain tension during the functional life of the belt. There are severe limitations placed on the selection of the proper tensile member component because it must stretch to maintain tension and installation and this stretch or low modulus also limits the operating belt tension and power transmission due to this low modulus.

SUMMARY

This section provides a general summary of the disclosure, and is not a necessarily a comprehensive disclosure of its full scope or all of its features.

In a first aspect of the disclosure, an endless belt is provided which includes a compression section, a tension section, and a cover layer, together defining a longitudinal direction of the endless belt. The tension section has a plurality of tensile members extending at an angle of 0° to 45° relative to the longitudinal direction of the endless belt, and the tensile members are orientated a zig-zag pattern. In some cases, the plurality of tensile members are extended along the longitudinal direction of the endless belt at an angle of 0°. Each of the plurality of tensile members may be continuous or discontinuous. The tensile members may be laid in a plane substantially parallel with the longitudinal direction of the belt.

In some aspects, the tension section of the endless belt includes two sets of a plurality of tensile members, where the first set tensile members are orientated in a first zig-zag pattern and the second set of tensile members are orientated in a second zig-zag pattern. In some cases, the first zig-zag pattern and the second zig-zag pattern are the same, while in some embodiments, the first zig-zag pattern and the second zig-zag pattern have different pattern frequencies. The first set tensile members may provide a first modulus and the second set of tensile members may provide a second modulus.

Another aspect includes an endless belt having a compression section and a tension section, where the tension section includes two sets of a plurality of tensile members extending at an angle of 0° to 45° relative to the longitudinal direction of the endless belt, and the tensile members are orientated a zig-zag pattern. The plurality of tensile members of a first set may be orientated in a first zig-zag pattern and a plurality of tensile members of a second set may be orientated in a second zig-zag pattern. The first zig-zag pattern and the second zig-zag pattern may be the same, or have different pattern frequencies. In some cases, each of the plurality of tensile members extends in a longitudinal direction along the endless belt, and may be continuous. The two sets of a plurality of tensile members may, in some embodiments, be laid in separate planes that run substantially parallel with the longitudinal direction of the endless belt. In other embodiments, the two sets of a plurality of tensile members are in contact and are laid in a plane, which runs substantially parallel with the longitudinal direction of the endless belt. The first set tensile members may provide a first modulus and the second set of tensile members may provide a second modulus. Further, the endless may have an elongation value in the range of from about 0.5% to about 10%.

Yet another aspect provides an endless belt having a compression section, a tension section, and a cover layer, all of which define longitudinal direction. The tension section includes a plurality of planar sets, disposed either in one planar or several planes, where each set includes a plurality of tensile members extending along the longitudinal direction of the endless belt. Each of the plurality of tensile members is continuous along the longitudinal length of the endless belt, and each of the tensile members is orientated a zig-zag pattern.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
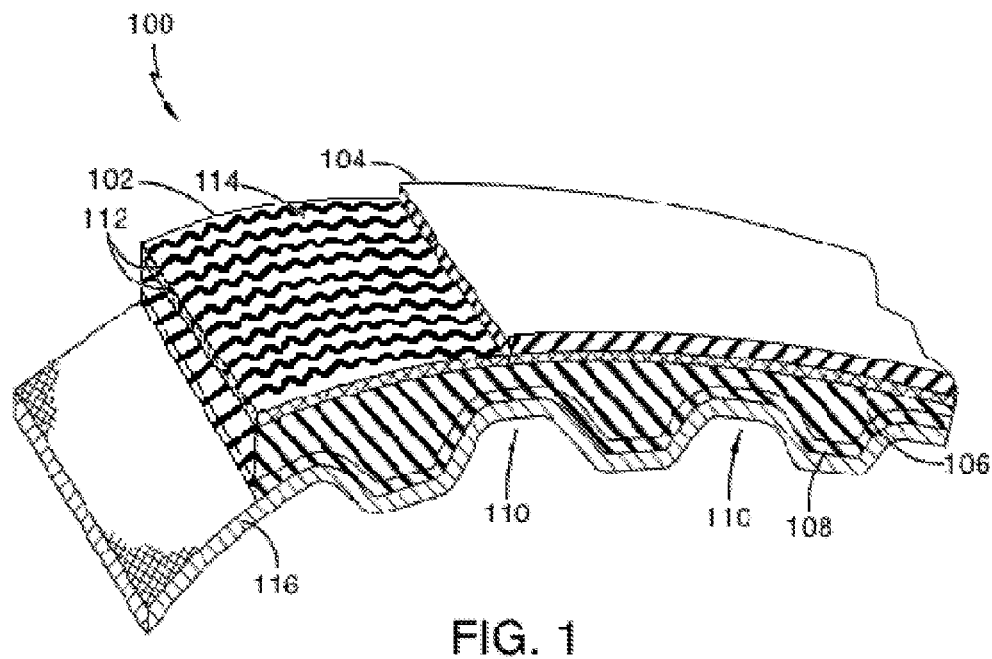
FIG. 1 illustrates a portion of an endless belt in a perspective sectional view, in accordance with an aspect of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that any numerical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

In accordance with some aspects of the disclosure, a more robust endless belt design provides a low modulus for tension maintenance and installation, but also provides additional modulus impact by using the belt carcass as part of the reaction that provides total modulus. Any belt will stretch when a load is applied to it, although the amount of stretch is usually very small. The amount of force to produce a specified stretch is known as the belt modulus. Belts according to the disclosure are low modulus belts having any suitable modulus values, such as values in the range of approximately 1000 N/mm to 5000 N/mm.

In some aspects, applying the concepts according to the disclosure may also provide belts built with one, two or more different sets of tensile members. Where there are two or more different sets of tensile members, belts may be constructed with either the same or different modulii that can independently provide elongation, modulus, and tensile strength depending on the demands of the drive. The concept involves applying the tensile member to the belt carcass during the belt building process. Rather than applying the tensile member in the normal straight line helix fashion as typically used, the tensile member is intentionally applied in a "zig-zag" manner, on the helix, either in the horizontal or radial plane of the belt. As used herein, the term "zig-zag" means laying the tensile member in a course having abrupt alternate right and left turns, or otherwise veering to right and left, or left and right, alternately. The zig-zag manner is a pattern made up of small corners at variable angles, though constant within the zig-zag, tracing a path between two parallel lines. It can be described as both jagged and fairly regular. From the point of view of symmetry, a regular zig-zag can be generated from a simple motif like a line segment by repeated application of a glide reflection. The repeats of the zig-zag pattern per unit length define a pattern frequency. In some aspects, the zig-zag patterned tensile members are laid in a plane, or planes, which run(s) parallel with the longitudinal direction of the belt.

Once cured into the belt carcass both the tensile member(s) and the modulus of the belt carcass provide resistance to elongation. The contribution of each to the total modulus can be tailored to provide the desired belt characteristics desired for the particular drive system. Any elongation of the belt demands that a tensile load be applied to the belt tensile member and because the tensile member was applied in a "zig-zag" course, the attempt to straighten the tensile member will cause compressive and tensile reaction from the polymeric materials comprising the belt carcass.

Additionally, alternating types of tensile member, with the same or different "zig-zag" spacing, course, and/or severity, may be used such that one tensile member provides a low modulus reaction until the "excess" cord length provided by the "zig-zag" of the second cord is eliminated and then the modulus of the second cord can become predominant. The ability to provide both high and low modulus capability within the same belt will extend the application and use of low modulus belting. Such a belt has application wherever traditional low modulus belts are currently being used in automotive and industrial power transmission applications and can extend the range of application of these belts.

In a first embodiment, a portion of an endless belt is shown generally at 100 in FIG. 1 in a perspective sectional view, where belt 100 has a tension section 102 with tensile members disposed in a zig-zag orientation, a cover layer 104, and a compression section 106. The compression section has a plurality of transverse ribs 108 with a plurality of transverse grooves 110. The tension section 102 has tensile members 112 embedded in a suitable material 114. Tensile members 112 extend in a longitudinal direction along an endless length of the belt, in a zig-zag manner. The compression section 106, material 114 and cover layer 104 of the belt 100, or any other embodiments according to the disclosure, are formed from elastomeric materials. The elastomers may be any one of those known to be suitable for use in such belts, such as but not limited to polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), and ethylene alpha olefin elastomers such as ethylene propylene copolymers (EPM), and ethylene propylene diene terpolymers (EPDM), ethylene octene copolymers (EOM), ethylene butene copolymers (EBM), ethylene octene terpolymers (EODM), ethylene butene terpolymers (EBDM), silicone rubberpolychloroprene, polyurethane, IIR, IR, CSM, other thermosets, thermoplastic elastomers, alkylated chlorosulphonated material (CSM), hydrogenated nitrile butadiene rubber (HNBR), other polymer alloys, as well as equivalents of any of the foregoing. The elastomeric material forming the compression section 106 may be the same or similar to that forming the tension section 102. Alternatively, the elastomer of the compression section 106 may be of different base compounds from the elastomer in the tension section 102. The elastomeric material may also be reinforced with discrete fibers. In some cases, the fibers are laterally extending and have portions projecting from the side surfaces of the longitudinal ribs 108. Depending upon the end use of the belt, a continuous reinforcing layer of cords or fabric may be located at the surface of the compression section 106. The outermost surface of the compression section 106, forming the innermost surface of the belt 100, may be provided with a fabric layer 116 to alter the surface properties of the belt 100.

In accordance with the disclosure, the tensile members 112 in the tension section 102 may be any suitable structure and/or material, including, but not limited to yarns or cords. Materials forming the tensile members 112 are such materials as cotton, rayon, aramid, nylon (including nylon 4/6 and nylon 6/6), polyester, fiberglass, carbon fiber, polyimide, steel etc. It may be of any suitable and/or conventional form, including braid, wire, cord, or even of oriented discontinuous fibers etc, as well as equivalents of any of the foregoing. In some cases, tensile members 112 may be either a single strand or may comprise a twisted yarn comprising two or more strands. Where used, the yarns may, in some cases, be coated with a suitable adhesive, including the dual adhesive coating of a first coat of an epoxy-latex mixture and a second adhesive coat of resorcinol-formaldehyde latex (RFL). Such a dipped yarn is more disclosed in U.S. Pat. No. 6,824,871, fully incorporated herein by reference thereto. To achieve the desired flex fatigue while maintaining a sufficient modulus for the tensile members 112, where twisted yarns are used, the individual yarns may have a twist multiplier in the range of 1.0-1.5. The twist multiplier for any of the elements is calculated by the universal equation of twist multiplier wherein the twist multiplier is equal to the value of turns per meter times the square root of the denier as measured in dTex, said value then divided by 3000 (i.e. twist multiplier=[turns per meterxsquare root of dTex]/3000). Tensile members with these twist multiplier values result in a belt having a good flex fatigue while maintaining a high modulus. Higher twist values may provide a slightly better flex fatigue to the belt but would reduce the belt modulus. Conversely, lower twist values would increase the belt modulus, but reduce flex fatigue—a critical feature for a power transmission belt.

Within the belt 100, or any other embodiments according to the disclosure, the tensile members 112 are inclined at an angle of 0° to 30° relative to the longitudinal direction of the belt. The inclination angle of the tensile members 112 in the belt affects the elongation properties of the belt. Due to the high tensile strength of the tensile members 112, the lower the inclination angle of the tensile members 112 within the belt, the lower the elongation of the belt while a greater cord inclination angle yields a more elastic belt.

Figure 2:
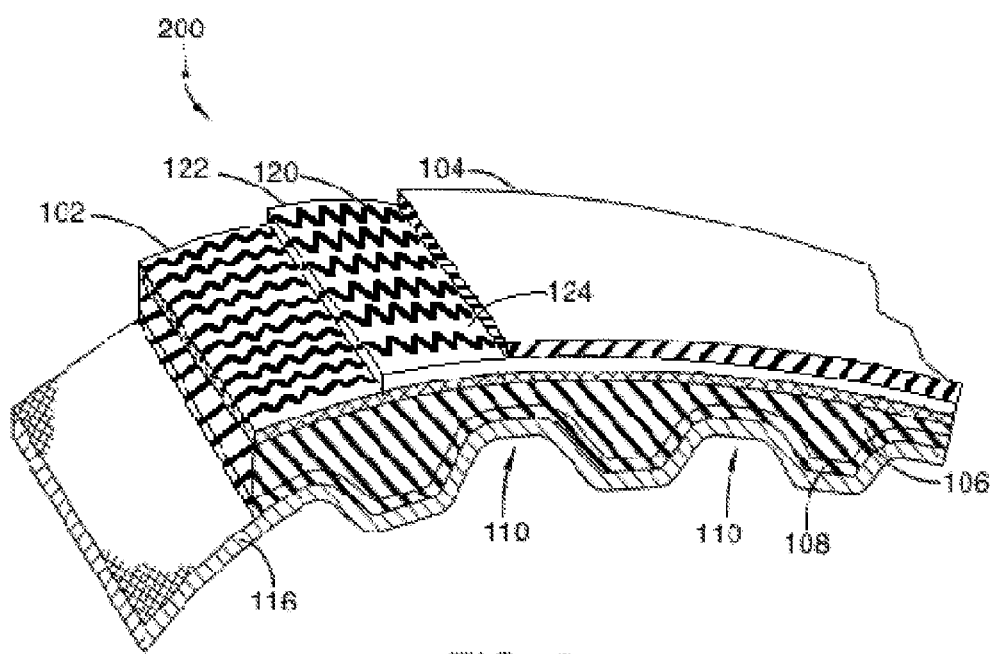
FIG. 2 depicts a portion of another endless belt embodiment in a perspective sectional view, in accordance with the disclosure; and, FIG. 3 illustrates a portion of an endless poly-V belt 300 in perspective sectional view, in accordance with some aspects of the disclosure.

In another embodiment, a belt 200, depicted in FIG. 2 in perspective sectional view, has a second set of tensile members 120 disposed in a zig-zag orientation. Belt 200 also includes cover layer 104, tension section 102, compression section 106, and fabric layer 116. Tensile members 120 may be disposed in tension section 102 in some aspects, while in some other aspects, tensile members 120 are included in a second tension section 122, and embedded in a suitable material 124. In the embodiment shown in FIG. 2, material 124 and material 114 may be in the same section or separate sections. Tensile members 120 and material 124 may be any of those materials described in the foregoing, respectively. In embodiments where two separate sets of tensile members are used, results in a belt with an ability to provide both high and low modulus capability within the same belt will extend the application and use of low modulus belting.

Figure 3:
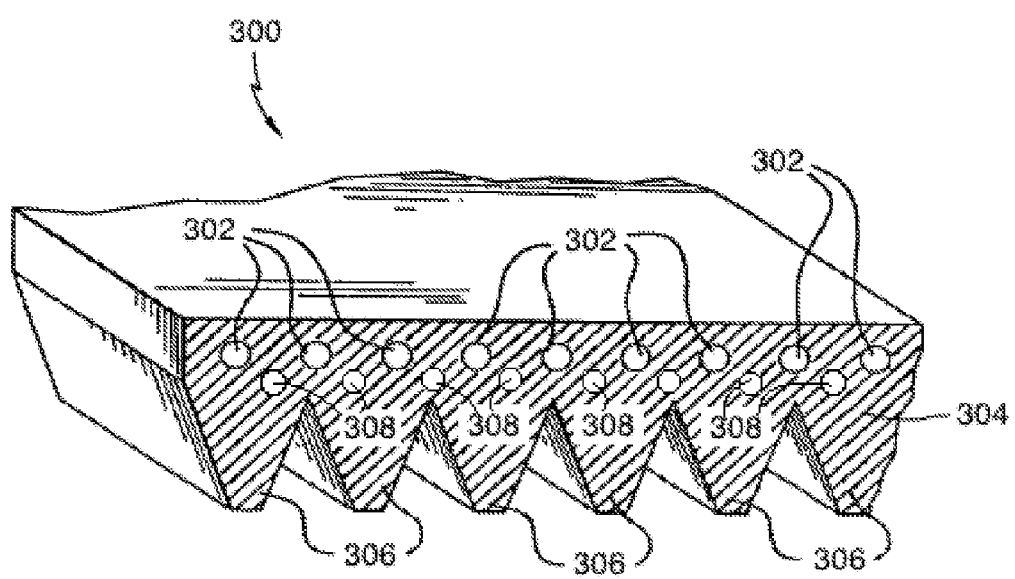

In yet another embodiment, a portion of an endless poly-V belt 300, shown in FIG. 3 in perspective sectional view, with a cross section taken perpendicular to the longitudinal direction of belt 300. Belt 300 includes tensile members 302, which are shown embedded in elastomeric body 304. Tensile members 302 extend in a longitudinal direction along an endless length of the belt, in a zig-zag manner, similar to that described in FIGS. 1 and 2 described above. Ribs 306 projects from one side of the belt and extend longitudinally along an endless length of the belt as well. Elastomeric body 304 may include any of the materials described above, as well as equivalents of any of the foregoing. In some embodiments, belt 300 may further include a second set of tensile members 308 extending in a longitudinal direction along an endless length of the belt, in a zig-zag manner.

Belt embodiments according to the disclosure have an elastic modulus relative to the belt width and measured in the lengthwise direction in the range of 1000 N/mm to 5000 N/mm. Such measurement includes a stress-strain curve average slope from a stress range of 150 to 300 N/rib/strand on the third of three belt elongation cycles. This results in an elongation in the range of approximately 0.5% to 10%. The belt test apparatus includes a tensile test machine, such as an Instron® or equivalent known in the art. To test, a belt is placed in an inverted position on a set of test pulleys in the tensile test machine. Inverted meaning the ribbed portion is not engaged with the test pulleys. The test pulleys are not rotated during the test. The belt is subjected to three load cycles on the test machine in order to stabilize the belt. The belt modulus is determined from the third of three load cycles on the test machine.

In addition to the endless belt types described above, any power transmission belt design, such as V-belts, flat belts, other synchronous belts having any of several tooth shapes, timing belts, banded belts, double sided V-belts, wedge cogged belts, fractional belts, metric belts, and the like, are included within the scope of the disclosure.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An endless belt comprising a compression section, a tension section, and a cover layer, which define a longitudinal direction, wherein the tension section comprises a two sets of tensile members extending at an angle of 0° to 45° relative to the longitudinal direction of the endless belt, and wherein the tensile members are orientated a zig-zag pattern; and,
wherein a first set of tensile members are orientated in a first zig-zag pattern and a second set of tensile members are orientated in a second zig-zag pattern, and wherein the first zig-zag pattern and the second zig-zag pattern have different pattern frequencies.

2. The endless belt of claim 1 wherein the plurality of tensile members are extended along the longitudinal direction of the endless belt at an angle of 0°.

3. The endless belt of claim 2 wherein each of the plurality of tensile members is continuous.

4. The endless belt of claim 1 wherein the tensile members are laid in a plane parallel with the longitudinal direction of the belt.

5. The endless belt of claim 1 wherein the first set tensile members provide a first modulus and the second set of tensile members provide a second modulus.

6. An endless belt comprising a compression section and a tension section, wherein the tension section comprises two sets of a plurality of tensile members extending at an angle of 0° to 45° relative to the longitudinal direction of the endless belt, and wherein the tensile members are orientated a zig-zag pattern; and,
wherein a plurality of tensile members of a first set are orientated in a first zig-zag pattern and a plurality of tensile members of a second set are orientated in a second zig-zag pattern, and wherein the first zig-zag pattern and the second zig-zag pattern have different pattern frequencies.

7. The endless belt of claim 6 wherein each of the plurality of tensile members extends in a longitudinal direction along the endless belt.

8. The endless belt of claim 7 wherein each of the plurality of tensile members is continuous.

9. The endless belt of claim 6 wherein the two sets of a plurality of tensile members are laid in separate planes which run parallel with the longitudinal direction of the endless belt.

10. The endless belt of claim 6 wherein the two sets of a plurality of tensile members are in contact and are laid in a plane which runs parallel with the longitudinal direction of the endless belt.

11. The endless belt of claim 6 wherein the first set tensile members provide a first modulus and the second set of tensile members provide a second modulus.

12. The endless belt of claim 6 wherein the plurality of tensile members extending at an angle of 0° to 30° relative to the longitudinal direction of the endless belt.

13. The endless belt of claim 6 having an elongation in the range of from 0.5% to 10%.

14. An endless belt comprising a compression section, a tension section, and a cover layer, which define longitudinal direction, wherein the tension section comprises two planar sets of a plurality of tensile members extending along the longitudinal direction of the endless belt, wherein each of the plurality of tensile members is continuous, and wherein each of the tensile members is orientated a zig-zag pattern; and,
wherein a first planar set of tensile members are orientated in a first zig-zag pattern and a second planar set of tensile members are orientated in a second zig-zag pattern, and wherein the first zig-zag pattern and the second zig-zag pattern have different pattern frequencies.

* * * * *